US008184892B2

(12) United States Patent
Peters et al.

(10) Patent No.: US 8,184,892 B2
(45) Date of Patent: *May 22, 2012

(54) METHOD AND APPARATUS FOR TOMOSYNTHESIS PROJECTION IMAGING FOR DETECTION OF RADIOLOGICAL SIGNS

(75) Inventors: Gero L. Peters, Paris (FR); Serge Muller, Guyancourt (FR); Sylvain Bernard, Montigny le Bretonneux (FR); Razvan Jordache, Paris (FR)

(73) Assignee: General Electric Company, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/176,357

(22) Filed: Jul. 5, 2011

(65) Prior Publication Data
US 2011/0261927 A1 Oct. 27, 2011

Related U.S. Application Data

(63) Continuation of application No. 11/545,305, filed on Oct. 10, 2006, now Pat. No. 7,974,455.

(30) Foreign Application Priority Data

Feb. 9, 2006 (FR) ...................................... 06 50469

(51) Int. Cl.
*G06K 9/00* (2006.01)
(52) U.S. Cl. ....................................... 382/131; 382/154
(58) Field of Classification Search .......... 382/128–132; 378/37
See application file for complete search history.

(56) References Cited

U.S. PATENT DOCUMENTS

| | | | |
|---|---|---|---|
| 2002/0184172 A1* | 12/2002 | Shlain et al. ..................... 706/20 |
| 2003/0194051 A1* | 10/2003 | Wang et al. ..................... 378/37 |
| 2005/0113961 A1 | 5/2005 | Sabol et al. |
| 2005/0135695 A1 | 6/2005 | Bernard et al. |
| 2006/0177125 A1 | 8/2006 | Chan et al. |
| 2006/0210131 A1 | 9/2006 | Wheeler et al. |
| 2007/0003117 A1 | 1/2007 | Wheeler et al. |
| 2007/0052700 A1 | 3/2007 | Wheeler et al. |
| 2007/0076928 A1 | 4/2007 | Claus et al. |

OTHER PUBLICATIONS

Peter et al. ("Reconstruction—Independent 3D CAD for calcification Detection in Digital Breast Tomosynthesis Using Fuzzy Particles", CIARP 2005, LNCS 3772, pp. 400-408, Spring-Verlag Berlin Heidelberg, Nov. 15, 2005).*

(Continued)

*Primary Examiner* — Vu Le
*Assistant Examiner* — Amara Abdi
(74) *Attorney, Agent, or Firm* — Cantor Colburn LLP

(57) ABSTRACT

A method of image processing in a radiological apparatus includes reconstructing a 3D image of a body from a set of radiography projection images, locating structures presumed to be representative of 3D radiological signs within the 3D image, determining a set of 2D candidate particles corresponding to projections of the presumed 3D radiological signs, assigning, through a fuzzy logic description, to the 2D candidate particles a degree of membership in 2D membership classes of a set of membership classes, each membership class being relative to a type of radiological sign, considering a 2D fuzzy particle being formed by the set of the 2D candidate particles and by their respective degrees of membership in a class, making an aggregate of the 2D fuzzy particles to obtain 3D fuzzy particles in a digital volume, and determining a degree of confidence for each 3D radiological sign from the 3D fuzzy particles.

20 Claims, 4 Drawing Sheets

OTHER PUBLICATIONS

Peter et al: "Reconstruction-Independent 3D CAD for calcification Detection in Digital Breast Tomosynthesis Using Fuzzy Particles", CIARP 2005, LNCS 3772, pp. 400-408, Spring- Verlag Berlin Heidelberg, Nov. 15, 2005.*

Peters et al., "Reconstruction-independent 3D CAD for calcification detection in digital breast tomosynthesis using fuzzy particles", Progress in Pattern Recognition, Image Analysis and Applications, 10th Iberoamerican Congress on Pattern Recognition, CIARP 2005, proceedings (Lecture notes) in Computer Science, vol. 3773, Nov. 15, 2005, pp. 400-408.

Chan et al., "Computer-aided Detection on Digital Breast Tomosynthesis (DBT) Mammograms: Comparison of Two Approaches", RSNA, Nov. 30, 2004, Code: SSG17-01, Session: Physics (Breast CAD: Multimodalities).

Reiser et al., "A Reconstruction-Independent Method for Computerized Detection of Mammographic Masses in Tomosynthesis Images", IWDM 2004, Jun. 2004.

* cited by examiner

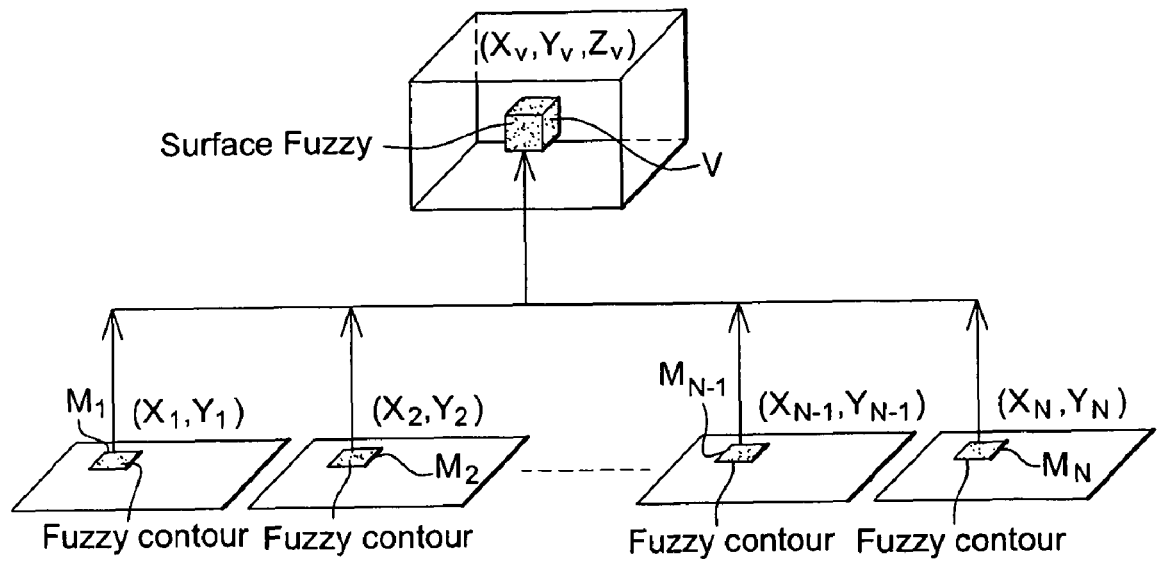
Fig. 5
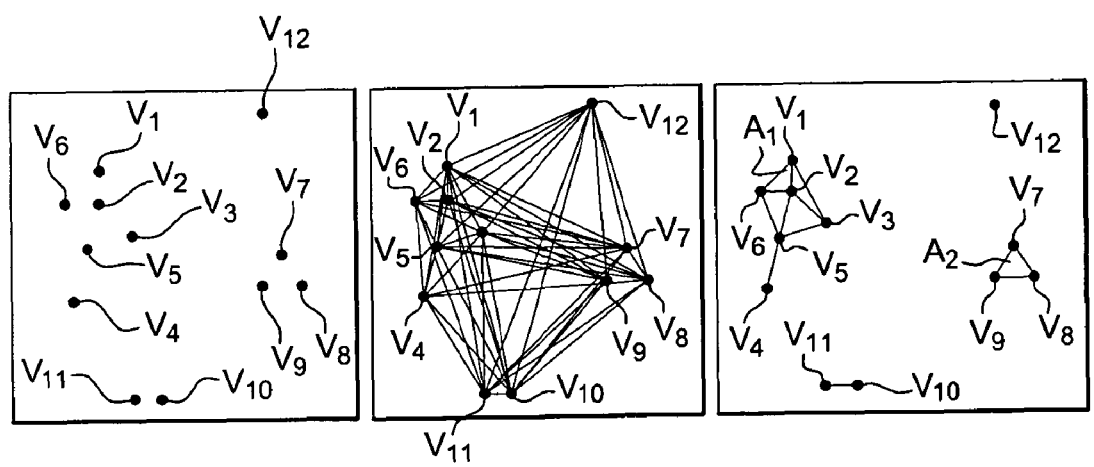
Fig. 6a  Fig. 6b  Fig. 6c

US 8,184,892 B2

METHOD AND APPARATUS FOR TOMOSYNTHESIS PROJECTION IMAGING FOR DETECTION OF RADIOLOGICAL SIGNS

CROSS REFERENCE TO RELATED APPLICATIONS

This application is a continuation of Co-pending U.S. patent application Ser. No. 11/545,305, filed Oct. 10, 2006, which claims the benefit of priority under 35 USC 119(a)-(d) to French Patent Application No. 06 50469 filed Feb. 9, 2006, of which the entire contents of both applications are hereby incorporated by reference herein.

BACKGROUND OF THE INVENTION

An embodiment of the present invention is directed to a method and apparatus for tomosynthesis projection imaging for detection of radiological signs. An embodiment of the present invention can be applied to but not exclusively in the field of medical imaging, the field of non-destructive testing by X-rays and, more particularly, that of mammography. An embodiment of the present invention also relates to an apparatus for mammography comprising a method for image processing.

Mammography is widely used in the detection of lesions and the prevention of breast cancer. The radiological signs associated with these lesions may be either calcium deposits (called microcalcifications) grouped together in a region of space in clusters or opacities. The individual microcalcifications generally form small-sized elements (ranging from about 100 pm to 1 mm in diameter) that are more opaque to X-rays than the surrounding tissues. Opacities are dense regions where the X-rays are absorbed more intensely than in the adjacent regions.

However, it can happen that certain calcium deposits or certain opacities are not spotted. This phenomenon has many causes. In particular, since mammography images are the result of projections, they represent superimposed structures that disturb the visibility of the structures of the breast, and may lead to a falsely positive interpretation.

To resolve this problem of positive interpretation, there are mammography methods and apparatus in the prior art that produce a 3D image of the patient's breast. Such a method and apparatus acquires several projections of an object at different angles and thereafter reconstructs the 3D distribution of, this object by means of a tomography reconstruction algorithm. The goal then is to detect any lesions that might have been masked during the superimposition of the tissues that takes place during a classic acquisition by mammography projection.

However, this tomosynthesis mammography method and apparatus has drawbacks. In such digital tomosynthesis screening methods and apparatus, a digital volume reconstruction, typically containing 50 to 80 slices, is made for an average breast. Consequently, the quantity of information to be managed is very great. Similarly, access to a piece of information having clinical interest takes much more time since this information is sought sequentially in the volume, side by side.

For present-day mammography method and apparatus, the frequency of use or the rate of medical acts is a vital fact because this frequency comes into play in the economics of the method and apparatus. However, these tomosynthesis mammography methods and apparatus cannot be subjected to high frequency of use because the time of access to information of clinical interest is very great. Furthermore, these methods and apparatus offers no guarantee of screening success since the screening depends on the time taken to locate information of clinical interest.

Another problem, which is more specific to mammography but can, however, occur in other fields, is related to the necessity of being able to analyze certain radiological signs, which become clinically interesting between 100 pm and 1 rnrn. Since the resolution of the detector is presently 100 pm, a radiologist has to make rapid searches for smaller objects in large volumes

BRIEF DESCRIPTION OF THE INVENTION

An embodiment of the invention is directed at overcoming the drawbacks of the method and apparatus of the prior art. An embodiment of the invention is directed to a method and apparatus for image processing that can be used to detect radiological signs in series of 3D data. The time taken to locate these radiological signs is then greatly reduced. Thus, the method and apparatus can avert or reduce the possibility of lesions being overlooked by the radiologist during diagnosis.

An embodiment of the invention is directed to a method of image processing in a radiological apparatus, including reconstructing a 3D image of a body from a set of radiography projection images, locating structures presumed to be representative of 3D radiological signs within the 3D image, determining a set of 2D candidate particles corresponding to projections of the presumed 3D radiological signs, assigning, through a fuzzy logic description, to the 2D candidate particles a degree of membership in 2D membership classes of a set of membership classes, each membership class being relative to a type of radiological sign, considering a 2D fuzzy particle being formed by the set of the 2D candidate particles and by their respective degrees of membership in a class, making an aggregate of the 2D fuzzy particles to obtain 3D fuzzy particles in a digital volume, and determining a degree of confidence for each 3D radiological sign from the 3D fuzzy particles.

An embodiment of the invention is directed to a radiological apparatus which includes means for providing a source of radiation, means for detecting radiation after passing through a body to be imaged, means for providing control logic for processing signals detected by the means for detection, and a memory or microprocessor associated with the means for providing control logic. The memory or microprocessor is configured to perform a method of image processing. The method includes reconstructing a 3D image of a body from a set of radiography projection images, locating structures presumed to be representative of 3D radiological signs within the 3D image, determining a set of 2D candidate particles corresponding to projections of the presumed 3D radiological signs, assigning, through a fuzzy logic description, to the 2D candidate particles a degree of membership in 2D membership classes of a set of membership classes, each membership class being relative to a type of radiological sign, considering a 2D fuzzy particle being formed by the set of the 2D candidate particles and by their respective degrees of membership in a class, making an aggregate of the 2D fuzzy particles to obtain 3D fuzzy particles in a digital volume, and determining a degree of confidence for each 3D radiological sign from the 3D fuzzy particles.

An embodiment of the invention is directed to a mammography apparatus which includes a source of X-ray radiation, a detector of the X-ray radiation passing through an organ to be imaged, a rotatable support for the source of radiation, a holder for the organ, a pad for compressing the organ, and a control logic unit having a memory or microprocessor for processing signals detected by the detector. The memory or processor is configured to perform a method of image processing. The method includes reconstructing a 3D image of at least a portion of the organ from a set of radiography projection images, locating structures presumed to be representative of 3D radiological signs within the 3D image, determining a set of 2D candidate particles corresponding to projections of the presumed 3D radiological signs, assigning, through a fuzzy logic description, to the 2D candidate particles a degree of membership in 2D membership classes of a set of membership classes, each membership class being relative to a type of radiological sign, considering a 2D fuzzy particle being formed by the set of the 2D candidate particles and by their respective degrees of membership in a class, making an aggregate of the 2D fuzzy particles to obtain 3D fuzzy particles in a digital volume, and determining a degree of confidence for each 3D radiological sign from the 3D fuzzy particles.

BRIEF DESCRIPTION OF THE DRAWINGS

An embodiment of the invention will be understood more clearly from the following description and the accompanying drawings. These drawings are given by way of an indication and in no way restrict the scope of the invention, in which:

FIG. 5 is a schematic view of an aggregation of different fuzzy particles of each projection image according to an embodiment of the invention; and FIGS. 6a to 6c are a schematic view of an exemplary method for determining clusters according to an embodiment of the invention

DETAILED DESCRIPTION OF THE INVENTION

An embodiment of the invention is directed to mammography that exploits the techniques of digital processing of the radiology image to improve the readability of the information. In an embodiment of the invention the method of image processing can be used to cope with a large quantity of the data by developing strategies capable of reducing time and simplifying access to information of clinical interest.

An embodiment of the present invention is directed to an algorithm for the detection of radiological signs in series of 3D data. The algorithm is used to indicate the position of the radiological signs on the 3D image by markers. The algorithm also has the potential to automatically distinguish malignant elements from benign elements.

In an embodiment of the invention, the algorithm comprises a fuzzy logic approach to model the ambiguities in the image. The use of fuzzy logic makes it possible to facilitate the decision method on presumed radiological signs by assembling all the available information on the presumed radiological signs as well as the information on the acquisition geometry. It assigns a degree of confidence to each presumed radiological sign in taking account of all the information on said radiological sign. This degree of confidence enables a precise decision to be taken on the presumed radiological sign.

In an embodiment of the invention, the algorithm is applied directly to the views of radiography projections. This gives an algorithm that does not include a reconstruction step and, furthermore, it is independent of any reconstruction algorithm whatsoever used to reconstruct a series of 3D data. Furthermore, a diminishing of the execution time is achieved since the image processing method depends chiefly on the number of projections and not on the number of reconstructed slices as in the prior art. In general, the number of projections is far smaller than the number of reconstructed slices in a breast.

An embodiment of the invention thus presents an approach that, in taking account of the ambiguities in the image, gives an improved detection result with a non-negligible gain in time.

In the case of the examination of a breast that is dense or a breast with numerous fibrous structures, the superimposition of the tissues at the time of the imaging of the projections leads to ambiguities in interpretation. In an embodiment of the invention, the algorithm also enables a reduction of the ambiguities in interpretation due to this superimposition of the tissues.

An embodiment of the invention, the method also tends to highlight all the radiological signs in the 3D image of the breast. This gives the physician greater confidence in the diagnostic tools.

Figure 1:
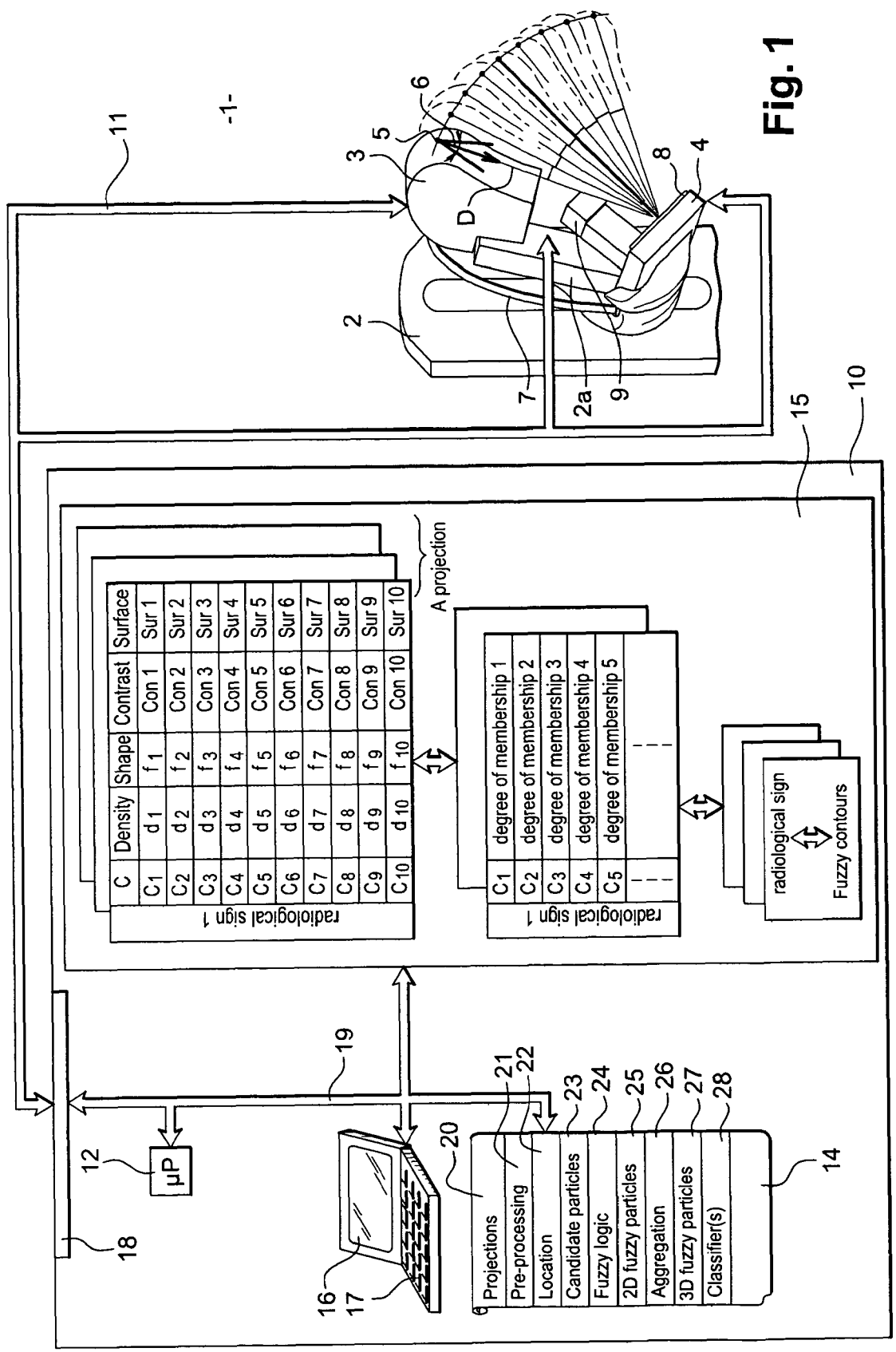
FIG. 1 is a schematic view of a radiological apparatus, such as an X-ray apparatus, in particular a mammography apparatus, which is provided with an embodiment of the invention.

FIG. 1 shows a radiological apparatus, such as an X-ray apparatus, which is particularly a mammography apparatus. The X-ray apparatus 1 has a fixed, vertical column 2. Apparatus 1 has a vertical support 2a hinged on the vertical column 2. Vertical support 2a may be obliquely oriented. The apparatus 1 has an X-ray emitter tube 3 and a detector 4 capable of detecting the X-rays emitted by the tube 3. Tube 3 is provided with a focus 5 that is the X-ray emitting focus. Focus 5 emits an X-ray beam 6 along a main direction of emission D. Tube 3 is borne or supported by an arm 7 fixed to the vertical support 2a. Arm 7 can be a C-arm. Arm 7 is hinged on the vertical column 2 and can be used to shift the tube 3 along a path in the form of a circular arc. Other arrangements are possible, enabling the tube to move in a plane or in a spherical portion. Tube 3 can then take up different positions spread in a tilt between two extreme positions. These two positions are, for example, symmetrical to each other relative to the plane of the column 2

Detector 4 is, for example, an electronic detector. Detector 4 is connected to the vertical support 2a opposite the tube 3 and in the main direction of emission D, so as to receive the X-ray beam 6.

Vertical support 2a is provided with a breast-holder tray 8 upon which a patient lays her breast. The breast-holder tray 8 is laid over the detector 4. The detector 4 is placed beneath the breast-holder tray 8. The detector 4 detects the X-rays that have gone through the patient's breast.

Furthermore, for reasons of stability and as well as image quality, the patient's breast needs to be compressed at the time of the radiography. Different compressive forces may be applied. These forces are applied through a compression pad 9 which compresses the breast on the breast-holder tray 8, depending on the type of examination to be made. The vertical support 2a has a sliding pad 9 that is capable of compressing the breast manually or is motor driven. Pad 9 can be formed from an X-ray transparent material such as plastic.

Vertical support 2a therefore carries the following assembly vertically, from top to bottom: the X-ray tube 3, the pad 9, the breast-support platform 8 and the detector 4.

While the pad 9, the patient's breast, the platform 8 and the detector 4 are fixed, the X-ray tube 3 can take up various positions in space relative to this assembly. In one variant, the detector 4 may be mobile and may take up various positions around the breast at the same time as the X-ray tube 3. In this case, the detector 4 is no longer fixedly joined to the breast-holder tray 8. The detector 4 may be flat or curved. It may be shifted rotationally and/or in translation.

After having received the beam 6 that crosses a part of the patient's body, the detector 3 emits electrical signals corresponding to the energy of the rays received. The electrical signals may then be transmitted to a control logic unit 10 by means of an external bus 11. These electrical signals enable the control logic unit 10 to produce a 2D image corresponding to the part of the body analyzed. This 2D image can be displayed by means of a screen associated with the control logic unit 10 or it may be printed. In one example, the control logic unit 10 comprises a microprocessor 12, a program memory 14, a data memory 15, a display screen 16 provided with a keyboard 17 and an output/input interface 18. The microprocessor 12, the program memory 14, the data memory 15, the display screen 16 provided with a keyboard 17 and the input/output interface 18 are interconnected by an internal bus 19.

In practice, when an apparatus is said to have performed an action, this action is performed by a microprocessor of the apparatus controlled by instruction codes recorded in a program memory of the apparatus. The control logic unit 10 is such a microprocessor or program memory. The control logic unit 10 is often made in integrated-circuit form.

The program memory 14 is divided into several zones, each zone corresponding to instruction codes in order to fulfill a function of the method and apparatus. Depending on variants of the embodiment of the invention, the memory 14 has a zone 20 having instruction codes to set up a path of the tube 3 and to control the emission of a multiplicity of projection images along this path. The memory 14 has a zone 21 having instruction codes to carry out a pre-processing of the projected images in order to correct artifacts due to the acquisition geometry.

Memory 14 has a zone 22 comprising instruction codes for the locating, on each projected image, of the presumed radiological sign, by means of created markers. The memory 14 has a zone 23 comprising instruction codes to define a set of possible candidate particles for each of marker of presumed radiological signs. Memory 14 has a zone 24 comprising instruction codes to implement a fuzzy logic programmed. This fuzzy logic programmed determines, for each candidate particle, a degree of membership in each membership class called a 2D class that is relative to a type of radiological sign, each class being pre-determined. This degree of membership is determined as a function of the attributes of each candidate particle.

Memory 14 has a zone 25 comprising instruction codes to define, for each presumed radiological sign, a 2D fuzzy particle formed by the set of candidate particles as well as their respective degrees of membership. Memory 14 has a zone 26 comprising instruction codes to implement an aggregation of the 2D fizzy particles of each of the projection images. In an embodiment of the invention, the aggregation is an operation during which a piece of information is assigned to a voxel of a digital volume obtained by the acquisition geometry. This information is taken from the pixels that correspond to this voxel in the different images projection images. The aggregation gives 3D fuzzy particles corresponding to a combination of the 2D fuzzy particles of each projection image.

Memory 14 has a zone 27 comprising instruction codes to process the 3D k z y particles of the digital volume for the extraction therefrom of the attributes characterizing each 3D fuzzy particle. Memory 14 has a zone 28 comprising instruction codes to transmit the extracted attributes to a classifier in order to give a degree of confidence to the 3D k z y particles. This degree of confidence is the degree of lesion that can be given to the 3D fuzzy particles in order to be a true radiological sign.

In an embodiment of the invention, and for an understanding of the remainder of the description, a particle is a contour of the radiological sign. It is understood that the particle can also be a connected component of the radiological sign. A connected component is the contour and set of pixels present in and on the contour. When the particle is a contour, the aggregation of the fuzzy particles gives fuzzy surfaces. When the particle is a connected component, the aggregation of the fuzzy particles gives fuzzy volumes.

Control logic unit 10 proceeds by sampling a series of exposures of the tube 3. The breast and hence the detector are thus irradiated during consecutive exposures. For these exposures, the focus of the X-ray tube occupies positions that may be fixed and angularly distributed. In one example, and although this may not be taken to be a limitation of the scope and extant of the invention, the angular exploration can be equal to 60 degrees, plus or minus 30 degrees relative to a median direction of irradiation, generally perpendicular for a mammography apparatus. During this exploration, a certain number of beams 6 are acquired, for example 9, 11, 13 or other numbers depending on the desired precision. In the example of FIG. 1, the number of beams is nine. Thus all the beams 6 are acquired in a single scan. Each beam 6 represents a radiography projection view.

Figure 2:
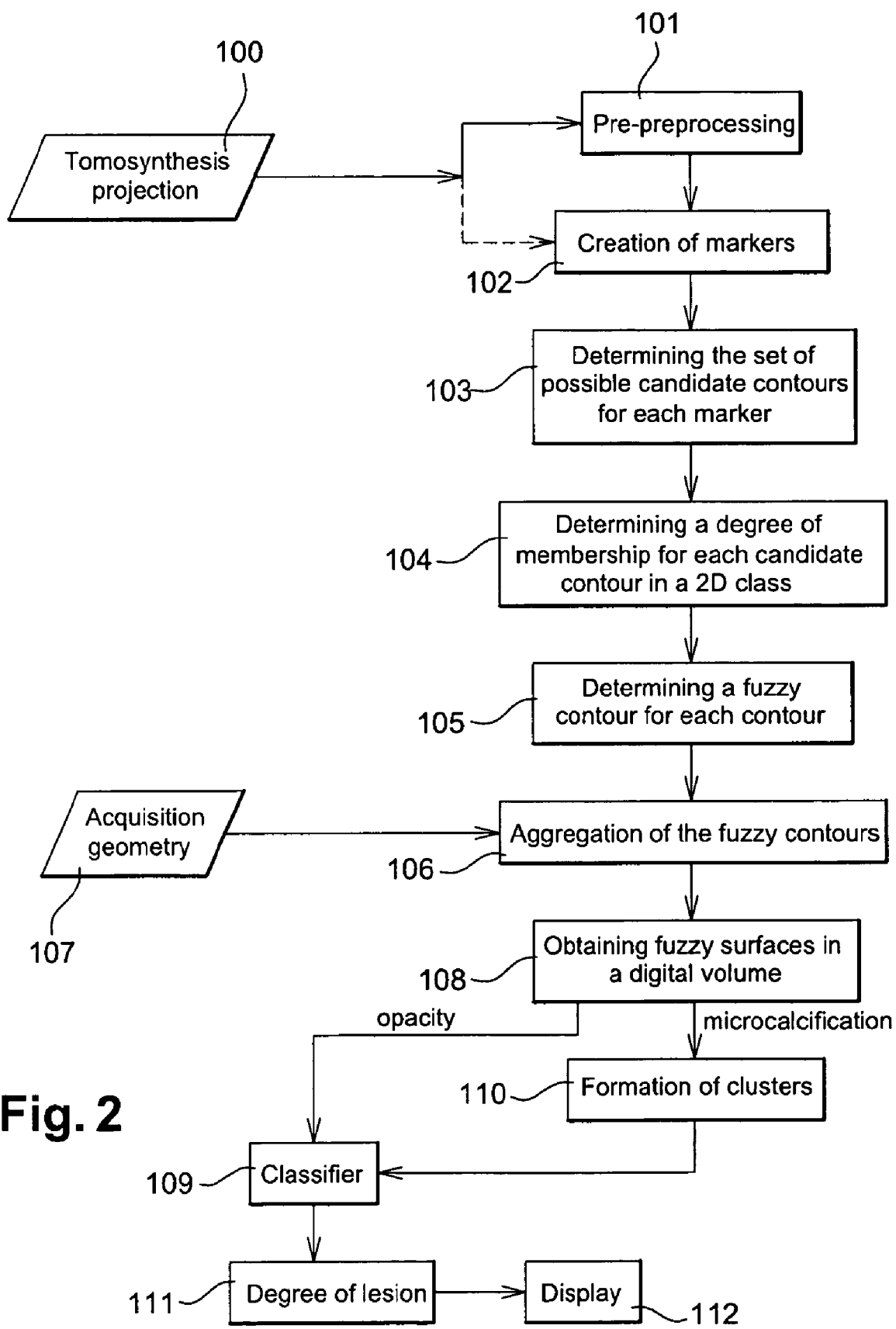
FIG. 2 illustrates a flow diagram implementing an embodiment of the method.

FIG. 2 illustrates a flow diagram for implementing an embodiment of the method. In implementing the flow diagram, the image processing method is applied to each piece of image data representing each projection image. These pieces of image data are given directly by the digital detector to the control logic unit. It is on the basis of these pieces of image data that the processing method is used to locate elements that could constitute radiological signs. The presumed radiological signs may be microcalcifications or opacities.

In FIG. 2, X-ray tube 3, in step 100, emits X-ray intensities going through the patient's breast for a multiplicity of projection images, in a pre-determined path. The detector 4 acquires the X-ray image data representing the projection images. The control logic unit 10 processes each of the pieces of X-ray image data individually.

In step 101, the control logic unit 10 applies a pre-processing operation to each of the pieces of the X-ray image data. In this pre-processing step 101, the control logic unit 10 eliminates the artifacts introduced, firstly, by the acquisition geometry and, secondly, by the detection of the contour of the breast. The artifacts, which are introduced by the acquisition geometry, are chiefly due to the acquisition of the multiplicity of projection images. Plates of the collimator of the tube describe the same trajectory as the X-ray tube. As a consequence, the angular aperture that defines the surface of the detector on which the beam is projected is no longer coplanar with the detector. Thus, the trajectory of the focus of the X-ray tube is not homothetic with the position of the detector. This leads to a trapezoidal deformation of the field exposed and thus presents artifacts along the contours of the acquired image data.

The control logic unit 10 repositions each of the pieces of image data on the region of interest (ROI), i.e., the region of the image containing the patient's breast. For each piece of image data, the control logic unit 10 then defines a region of interest including a minimum of artifacts, in using prior knowledge of the acquisition geometry. Step 101 is designed to apply the image-processing method of an embodiment of the invention for the detection of elements liable to constitute radiological signs solely on the region of interest. This reduces the processing time and prevents false detections in regions containing artifacts. Step 101 is used to convert the pieces of image data coming from the detector into pieces of image data that can be exploited for subsequent processing. Step 101, which may be indicated as a pre-processing step, the pieces of image data can be filtered to reduce the impact of noise. Step 101 depends essentially on the acquisition parameters of the apparatus, and may therefore change between the different versions of existing tomosynthesis acquisition apparatus.

In one variant, it is possible that the control logic unit 10 does not apply the image data pre-processing step 101 and passes directly to step 102. In step 102, the control logic unit 10 applies a binary mask to each piece of pre-processed image data in order to separate the breast from the background. Each piece of image data obtained is then converted into a contrast image that is defined for each pixel of each piece of image data. This conversion is obtained by a Mexican-hat-shaped wavelet filtering. This filtering will be described in FIG. 3. The control logic unit 10 creates markers to label all the pixels having presumed radiological signs. The control logic unit 10 extracts a map of the markers representing the presumed radiological signs for subsequent processing.

At step 103, the control logic unit 10 determines the set of possible candidate contours to be assigned to each presumed radiological sign of each of the pre-processed pieces of image data. In an embodiment of the invention, the candidate contours are determined by successive thresholds. Each threshold defines a contour candidate. Step 103 will be described in FIG. 3.

At step 104, the control logic unit 10, by means of a fuzzy logic description, computes a degree of membership relative to a criterion of a predefined class for each possible candidate contour of each marker. For example, in the case of radiological signs such as microcalcifications, the criterion may be the surface area, the contrast gradient or any other attributes that might characterize the microcalcifications. For example, in the case of radiological signs such as opacities, the criterion may be the density of opacity.

Figure 3:
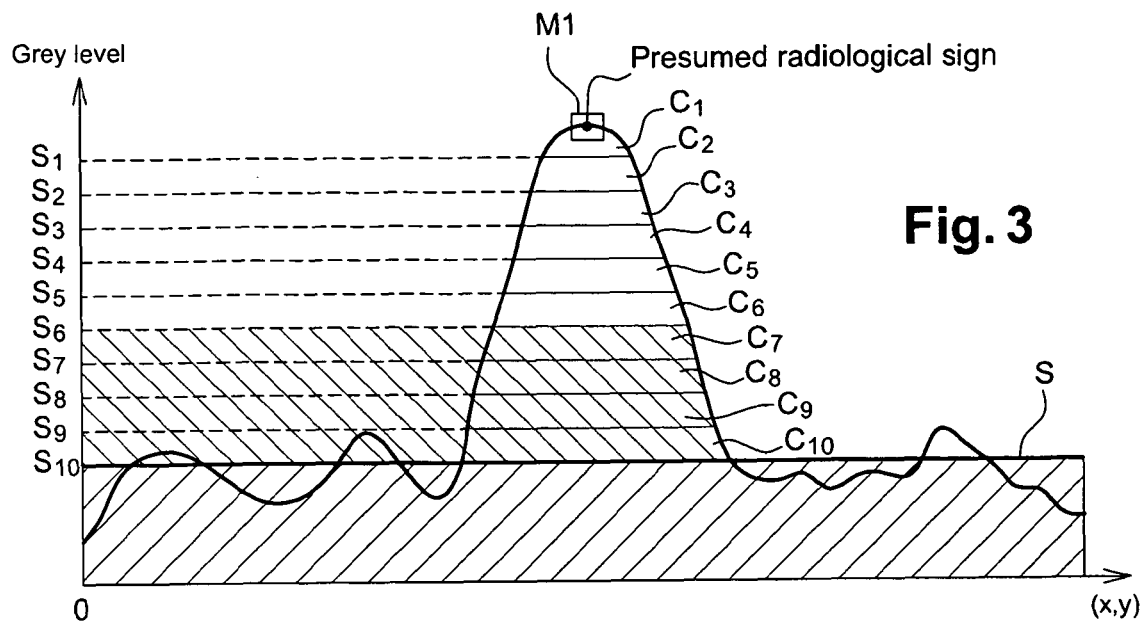
FIG. 3 gives a view, in a graph, of a mode for determining a set of candidate contours of a presumed localized radiological sign according to an embodiment of the invention.
Figure 4A:
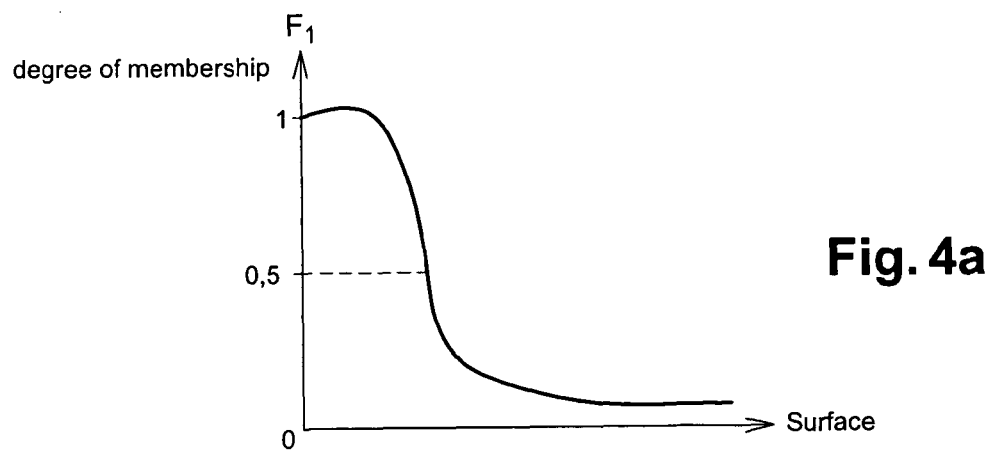
FIGS. 4a and 4b each show an example of a function of a criterion of predefined class used to assign a degree of membership in a class to a given candidate contour, according to an embodiment of the invention.
Figure 4B:
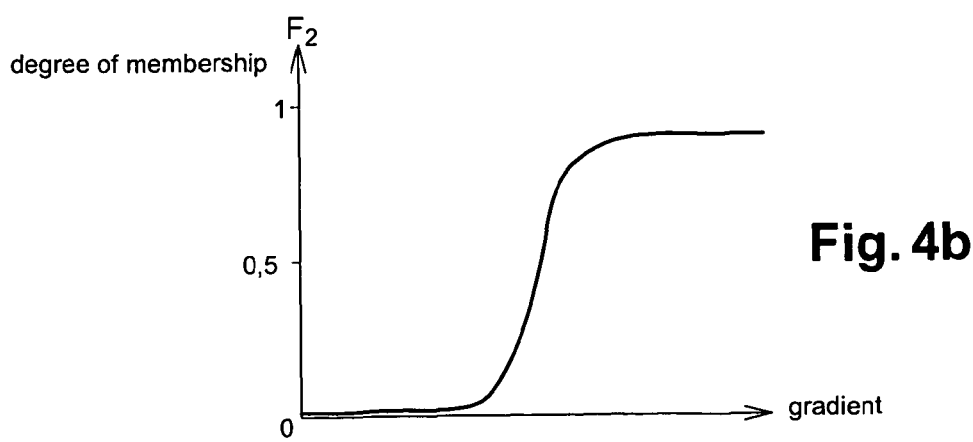

At the step 105, the control logic unit defines a fuzzy contour to be assigned to each of the markers of the map of each of the pieces of pre-processed image data. This fuzzy contour is formed by the set of candidate contours as well as their respective degrees of membership. FIG. 3 shows the determining of the set of possible candidate contours for a given marker. FIGS. 4a and 4b each show the obtaining of the degree of membership of a contour in the class of microcalcifications relative to a criterion. Data memory 15 of FIG. 1 shows a schematic view of the different steps of the description of the fuzzy logic. The different steps shall be described further below in the description of FIGS. 3, 4a, and 4b.

After the performance of separate detection operations in each of the pieces of image data, the control logic unit 10 performs step 106. Step 106 comprises an aggregation in digital volume of the fuzzy contours of each of the pieces of image data. In the prior art, a digital volume reconstruction is made of the pieces of image data or of the radiological values. In an embodiment of the invention, an aggregation in digital volume is made of the fuzzy contours of presumed radiological signs of each piece of image data. This aggregation in digital volume takes account of the acquisition geometry given by step 107, as shown in step 104.

At step 108, the aggregation of the step 106 produces a fuzzy surface for each of the presumed radiological signs. Each fuzzy surface is a possible combination of the candidate contours through the projection images. Each fuzzy surface is formed by a set of surface candidates as well as their respective degrees of membership in a predefined class called a 3D class. Each candidate surface is a possible combination of the candidate contours through the projection images. The degree of membership in each membership class called a 3D class relative to a type of radiological sign is determined by a fuzzy logic description. The control logic unit 10 assesses each of the fuzzy surfaces. It extracts attributes of these fuzzy surfaces.

When the radiological sign is an opacity, the control logic unit transmits the attributes directly to the classifier of step 109.

When the radiological sign is a microcalcification, the control logic unit 10 performs step 110. At step 110, the control logic unit 10 determines whether the fuzzy surfaces form a grouping in a cluster. For each determined cluster, the control logic unit 10 extracts attributes. Steps 108 and 110 are shown in FIGS. 6a to 6c.

At step 111, the control logic unit 10 computes a degree of confidence. This degree of confidence is computed as a function of the attributes of each cluster or of each fuzzy surface such as the surface, the shape, and the number of fuzzy surfaces present in the cluster as well as the degrees of membership of the candidate surfaces forming it. The attributes of the clusters of fuzzy surfaces are sent to the predefined classifier that outputs the degree of confidence of the radiological sign represented by the fuzzy surface of either cluster. The greater the extent to which the degree of confidence resembles or does not resemble a proven radiological signal, the higher will be the degree of confidence obtained and the closer will it be to 1 and 0 respectively. This degree of confidence can also be obtained by learning on a base of images in which the proven radiological signs have been marked, in using for example a decision tree, a neural network or else apparatus with support vectors.

At step 112, the clusters identified at the step 110 or the fuzzy surfaces may be displayed on a display screen 16. The display can be done by using graphic markers placed in the image or by modifying the grey levels of the detected clusters or the fuzzy surfaces leading to the improvement of the evidence of the results.

FIG. 3 shows the determining of the set of possible contours of a presumed radiological sign. The control logic unit 10 determines the presumed radiological signs in each piece of image data in creating markers. These markers specify the position (x, y) of the presumed radiological signs. Control logic unit 10 extracts a map of presumed radiological signs for each of the pieces of image data. The extraction is done by a filtering designed to react strongly to the presence of structures having a given size. In an embodiment of the invention, this extraction is obtained by wavelet filtering. This wavelet filtering is a method used to interpret the content of the pieces of image data. The control logic unit 10 uses wavelet filters of scale s to compute the contrast between a presumed radiological sign and its surrounding neighborhood. The corresponding equation is given in polar coordinates by the following equation:

$$f_s(r) = -\left(1 - \frac{r^2}{s^2}\right) \cdot e^{\frac{r^2}{s^2}}$$

This wavelet filtering enables the application of a scale s to each piece of image data so as to select the pixels showing a level of intensity greater than this scale s. This makes it possible to keep only the pixels having sufficient intensity in the filtered pieces of image data. In the determination of the scale s, the control logic unit 10 also takes account that the information lost at the time of the filtering cannot be retrieved at a subsequent stage of the algorithm. The control logic unit 10 therefore applies a detection algorithm to each of the pieces of image data in order to extract the pixels whose intensity is greater than the scale s. Thus, the control logic unit 10 performs a convolution of each piece of image data with the chosen wavelet filter. This emphasizes the structures of a given size in the pieces of image data. This is applied by means of an approach of several graduations to explain the variations foreseen in the size of the radiological signs. In each of the resulting pieces of image data, in one example, a maximum operator is combined with the scale s. This combination is aimed at reducing the impact of the noise to the minimum and of extracting only the response of the filter. To create a map of the presumed radiological signs, the result of the convolution is compared with the local variation of the level of background noise. The resulting pixels are examined in order to find connected zones. The connected pixels are then marked as presumed radiological signs. The control logic unit 10 uses the response of the filter to extract a map of the presumed radiological signs.

In an embodiment of the invention, control logic unit 10 applies the processing of the fuzzy logic to markers created for each position of connected pixels having higher intensities. The use of markers reduces the complexity of the processing of the fuzzy logic. It also optimizes the performance of the algorithm and of the execution time for this algorithm. In one variant, the control logic unit 10 can apply the processing of the fuzzy logic to each pixel of each piece of image data and hence keep a maximum amount of information. From the markers created, the control logic unit 10 creates a fuzzy contour for each marker. This can be done separately for each piece of image data.

FIG. 3 gives a view, in a given piece of image data, of a mode of processing a marker M of a presumed radiological sign, it being known that all the other markers of each piece of image data will be processed in the substantially the same way. Control logic unit 10 determines a set of possible candidate contours of the marker M in using, in an embodiment of the invention, a method of successive thresholds S1 to S10. The control logic unit 10 applies the successive thresholds S1 to S10 to the marker M. In the example of FIG. 3, the successive thresholds S1 to S10 are ten in number. They are represented for example by ten grey levels. Each threshold S1 to S10 has a range of pixel intensity different from the others. In an embodiment of the invention, the threshold S1 has a range of pixel intensity higher than the range of pixel intensity of the threshold S2, and so on and so forth. The number of thresholds as well as the range of pixel intensity of each threshold is chosen according to the type of result to be obtained.

Each marker M is processed separately. From the marker M, the control logic unit 10 creates a first link contour C1 surrounding the marker M and defined by the first threshold S1. The control logic unit 10 creates a second contour C2, defined by the second threshold S2. The control logic unit 10 thus creates respectively for each threshold S1 to S10 a contour C1 to C10 surrounding the marker M.

The control logic unit 10 applies the successive threshold S1 to S10 to the marker M. At each threshold, it verifies that one of the following two conditions is not present:

Condition 1: $A(C) \leq A_{max}$ where $A(C)$ represents the surface of the contour and $A_{max}$ represents the maximum permitted surface for a radiological sign surface; and Condition 2: $I(\rho,C) \geq I(\rho)_{max} - \Delta I_{max}$, where $I(\rho,C)$ represents the intensity of the pixel beneath the contour C of the presumed radiological sign p; $I(\rho)_{max}$ represents the maximum pixel intensity of the presumed radiological sign p; and $\Delta I_{max}$ represents the maximum variation of intensity permitted in a single presumed radiological sign. The control logic unit 10 detects the threshold giving the maximum candidate contour, as soon as it encounters condition 1 and condition 2. The marker M cannot have a contour greater than this maximum candidate contour. In the example of FIG. 3, the control logic unit 10 encounters both conditions 1 and 2 at the threshold S6. Consequently, the maximum candidate contour assigned to the marker M is the contour C6. The set of candidate contours C1 to C6 with their degrees of membership defines a fuzzy contour of the marker M. The determining of their degree of membership is shown in FIGS. 4a and 4b.

To determine the degree of membership of each candidate contour, the control logic unit 10 determines, for each candidate contour, the attributes that characterize it. These attributes may be, for example the surface area, the circumference, the contrast, the length, the morphology, the intensity, the homogeneity as well as the texture of the contour. The morphology, that provides information on the shape of the contour, may be given by the Feret ratio, which is the ratio between the greatest distance and the smallest distance of the contour. This morphology may also be given by the ratio between the external counter that is represented here by the contour C6 and the internal contour represented here by the contour C1.

Prior knowledge of the contours of the radiological signs is converted into a fuzzy set description. If the radiological sign is a microcalcification, prior knowledge is summarized as follows: the radiological signs are small and have high contrast. These two criteria are the expression of a description of a fuzzy set in using two attributes named surface and contrast gradient shown in FIGS. 4a and 4b. FIGS. 4a and 4b respectively show a function of a criterion F1 and F2 characterizing a 2D microcalcification class. The two criterion functions F1 and F2 respectively express the degree of membership of a presumed microcalcification candidate contour in a microcalcification that is predefined as a function of the surface and contrast gradient of the contour.

Should the radiological sign be an opacity, the prior knowledge is summarized as follows: the radiological signs have high density. The criteria characterizing the predefined 2D class of a radiological sign may be different from those cited here above. For each candidate contour C1 to C6, the control logic unit 10 computes a degree of membership as a function of its attributes relative to the predefined criteria of the 2D class. The degree of membership characterizes both the brightness and the shape of the contour. The brighter and rounder the contour, the higher the degree of membership.

For each marker of each piece of image data, the control logic unit determines a fuzzy contour comprising the set of candidate contours and their respective degrees of membership. In one example, to reduce the complexity of the algorithm and the execution time, the control logic unit 10 may compare the fuzzy contours with the predefined threshold.

This threshold may be chosen as a function of the size, shape and/or contrast gradient of a predefined radiological sign. In this case, the control logic unit 10 may consider the fuzzy contours above this threshold to as being liable to be radiological signs. The control logic unit 10 then eliminates all the fuzzy contours below this threshold from the map of markers.

After having performed separate operations of detection in each of the pieces of image data, the control logic unit 10 performs an aggregation in digital volume of the fuzzy contours of each piece of image data, in taking account of the acquisition geometry. This aggregation gives a digital volume of fuzzy surfaces. This aggregation in digital volume is performed by a combination of the information collected in each map of markers for a voxel, as can be seen in FIG. 5. FIG. 5 shows an embodiment of the aggregation of the fuzzy contours of each projection image. The aggregation is used to link up the fuzzy contours of each projection image with a fuzzy surface of the digital volume. The fuzzy surfaces are a possible combination of the fuzzy contours through the projection images. The fuzzy surfaces are formed by a set of candidate surfaces. Each candidate surface is a possible combination of candidate contours through the projection images. The fuzzy surfaces are formed by a set of candidate surfaces. Each candidate surface is a possible combination of candidate contours through the projections. This combination may be expressed in terms of equations as follows:

$$I(x_v, y_v, z_v) = \Psi_{k=1}^{N} (I_k(x_k, y_k)),$$

where $I(x_v, y_v, z_v)$ represents the intensity of the pixel at the position $(x_v, y_v, z_v)$, $I_k(x_k, y_k)$ representing the pixel of the $k^{th}$ of the N maps of markers corresponding to the position $(x_v, y_v, z_v)$, and $\Psi$ representing the aggregation operator used to achieve this relationship. This aggregation operator may be an operator such as a sum, a maximum, a mean or any other type of operator such as statistical commands. In an embodiment of the invention, the sum operator is used for an aggregation of the information of the different maps of markers for a given voxel.

The X-ray tube may be mobile and emits x-rays on an immobile detector raises problems of artifacts that are inherent to the acquisition geometry of a projection series. Depending on the angle of acquisition, parts of the breast are projected out of the active surface of the detector. This leads to a situation where the number of projections is not constant in the construction of the digital volume. In order to maintain a valid comparison between the different presumed radiological signs, the control logic unit 10 takes account of this constraint when it aggregates the fuzzy contours of the different projection images.

Once the fuzzy contours of all the maps of markers have been aggregated, the control logic unit 10 analyses the resultant fuzzy surfaces in the digital volume. For each candidate surface, the control logic unit 10 determines a degree of membership in a predefined 3D class through criteria defining this class. To determine the degree of membership of each candidate surface, the control logic unit determines the attributes characterizing it.

Prior knowledge of the surfaces of the radiological signs is converted into a fuzzy set description. Depending on at least one function of a criterion defining the predefined 3D class of radiological sign, the degree of membership of each candidate surface is determined as a function of the attributes that characterize it. The set of candidate surfaces with their respective degrees of membership defines the fuzzy surface.

When the radiological sign is an opacity, the control logic unit 10 extracts the attributes of each fuzzy surface. For each fuzzy surface, it transmits the attributes characterizing it as well as the set of candidate surfaces with their respective degrees of membership in a predefined classifier. The purpose of the classifier, inter alia, is to give a very precise decision on each fuzzy surface as a function of the attributes characterizing it. Such a classifier outputs information on the presence of a radiological sign or may even include the probability of a malignant tumor on a given conclusion. These classifiers may be a precise decision tree, a fuzzy decision tree using precise values, a fuzzy decision tree using fuzzy values, a neural network or vector support machine.

The decision on each fuzzy surface is defined by the degree of confidence assigned. After having obtained this decision, the control logic unit views the fuzzy surfaces in taking account of the degree of confidence assigned to them. In an example, during the display, the control logic unit 10 enhances the intensity of the contrast of the fuzzy surface relative to the intensity of its immediate environment. This enhancement depends on the degree of confidence. This makes it possible more particularly to emphasize the fuzzy surfaces for which the probability of constituting radiological signs is the greatest.

The final presentation image on which the fuzzy surfaces have been enhanced is displayed on a display screen for viewing by a practitioner.

When the radiological sign is a microcalcification, the control logic unit 10 determines a cluster grouping of the fuzzy surfaces. One mode of determining the cluster grouping is shown in FIGS. 6a to 6c. FIG. 6a shows the fuzzy surfaces of the digital volume. These fuzzy surfaces are indicated on the digital volume by 3D markers created by the control logic unit. These markers, which are a graphic annotation, are situated at the centre of gravity of the fuzzy surfaces. The control logic unit extracts the 3D markers serving as inputs for the cluster detection step. In one variant, the control logic unit may extract only the markers whose fuzzy surfaces have a high level of contrast in the digital volume. The control logic unit thus creates a graphic representation comprising 3D markers V1 to V10. This graphic representation of the 3D markers V1 to V10 is the basis of the data structure on which any subsequent processing for the detection of the cluster will be based. This graph represents the set of markers V1 to V10 and their relative positions in the 3D image. The control logic unit, after extraction of the markers, may determine the clustering of the fuzzy surfaces.

FIG. 6b shows a mode of determining clusters. To determine the grouping in a cluster of the 3D markers, the control logic unit measures the distances from each of the 3D markers V1 to V10 to each of the other 3D markers V1 to V10. To do this, it links together each pair of 3D markers by an edge whose internal value corresponds to the spatial distance of said pair of 3D markers.

FIG. 6c shows a mode of weighting the edges. Once the 3D markers are connected to one another, only the most significant ones are kept to form clusters of candidate particles. The control logic unit applies different criteria to implement the weighting of the edges. In the example of FIG. 6c, the edge weighting decision is based only on a value of the length of the edges. This value is computed by the difference between the positions of two 3D markers connected by their corresponding edge.

The control logic unit applies the threshold of the value of the edges in order to eliminate the inadequate edges. This threshold may be equal in one example to 2 cm or even 5 cm. Two 3D markers are considered to be close when their edge is below the threshold. Consequently, for a first 3D marker V1 thus close to a second 3D marker V2, the control logic unit assigns a first grouping of clusters A1. It assigns the same first grouping of clusters A1 to all the other 3D markers V3 to V10 close to the first 3D marker V1. Then, it also assigns this first grouping of clusters A1 to all the other 3D markers V3 to V10 close to the second 3D marker V2, and so on and so forth. A first grouping of clusters A1 is thus formed. In the same way, the control logic unit determines a second grouping of clusters A2 in analyzing the other 3D markers that do not form part of the first grouping of clusters A1. It thus determines all the groupings of clusters present in the digital volume.

In the example of FIG. 6c, the control logic unit thus determines a first grouping of clusters A1 formed by the 3D markers V1 to V6, a second grouping of clusters A2 formed by the 3D markers V7 to V9. The 3D marker V12 is not considered to be a cluster by the control logic unit because it considers a cluster to be formed by at least three close 3D markers. Similarly, the 3D markers V10 and V11 that are close to each other are not considered to be a grouping of clusters.

After having determined the groupings of clusters, the control logic unit determines the degree of confidence of these clusters. This degree of confidence is determined as a function of the attributes of the cluster. The control logic unit extracts a certain number of attributes characterizing the cluster so that the final decision is taken (on whether it is a cluster on a cluster). These attributes may be the morphology of the cluster and/or the distance between the 3D markers and/or the number of fuzzy surfaces present in the cluster and/or the attributes and as well as the set of candidate surfaces and their respective degrees of membership for each fuzzy surface present in the cluster. The control logic unit sends the classifier the attributes extracted from the cluster. The classifier gives information on the presence of a radiological sign or may even include the potential for determining a malignant tumor on a given conclusion. The purpose of the classifier, inter alia, is to give a very precise decision on each cluster as a function of the attributes of the corresponding cluster.

After having obtained the decision on each cluster, the control logic unit displays the clusters in taking account of the decision that is assigned to them. In an example, during the display, the control logic unit increases the intensity of the contrast of the cluster relative to the intensity of its immediate environment. This increase depends on the degree of confidence. This makes it possible more particularly to emphasize the clusters for which the probability of constituting radiological signs is the greatest.

The final presentation image on which the fuzzy surfaces have been enhanced is displayed on a display screen for being viewed by a practitioner.

In addition, while an embodiment of the invention has been described with reference to exemplary embodiments, it will be understood by those skilled in the art that various changes may be made in the function and/or way and/or result and equivalents may be substituted for elements thereof without departing from the scope and extent of the invention. In addition, many modifications may be made to adapt a particular situation or material to the teachings of the invention without departing from the essential scope thereof. Therefore, it is intended that the invention not be limited to a particular embodiment disclosed for carrying out this invention, but that the invention will include all embodiments falling within the scope of the appended claims. Moreover, the use of the terms first, second, etc. or steps do not denote any order or importance, but rather the terms first, second, etc. or steps are used to distinguish one element or feature from another. Furthermore, the use of the terms a, an, etc. do not denote a limitation of quantity, but rather denote the presence of at least one of the referenced element or feature.

The invention claimed is:

1. A method of image processing in a radiological apparatus, comprising:
reconstructing a 3D image of a body from a set of radiography projection images;
locating structures presumed to be representative of 3D radiological signs within the 3D image;
determining a set of 2D candidate particles corresponding to projections of the presumed 3D radiological signs;
assigning, through a fuzzy logic description, to the 2D candidate particles a degree of membership in 2D membership classes of a set of membership classes, each membership class being relative to a type of radiological sign;
considering a 2D fuzzy particle being formed by the set of the 2D candidate particles and by their respective degrees of membership in a class;
making an aggregate of the 2D fuzzy particles to obtain 3D fuzzy particles in a digital volume; and
determining a degree of confidence for each 3D radiological sign from the 3D fuzzy particles.

2. The method according to claim 1, wherein the candidate particle to be assigned to each presumed radiological sign is determined by applying successive thresholds; and for each threshold, a candidate particle characterizing the presumed radiological sign is defined.

3. The method according to claim 2, wherein the successive thresholds correspond to successive grey levels.

4. The method according to claim 2, wherein the candidate particle is determined when the surface of the candidate particle is smaller than or equal to the predetermined maximum surface, and when the contrast of the candidate particle is greater than or equal to a predetermined maximum intensity of contrast minus the maximum variation of intensity of contrast permitted, then this candidate particle is the maximum particle that can be assigned to the presumed radiological sign.

5. The method according to claim 1, wherein:
each 3D fuzzy particle is formed by a set of 3D candidate particles and their respective degrees of membership;
each 3D candidate particle is obtained by an aggregation operation from the 2D candidate particles through the projections; and
by a fuzzy logic description, each 3D candidate particle is assigned a degree of membership in each of the 3D classes of membership of a set of 3D membership classes, each membership class pertaining to a type of radiological sign, each class being predetermined.

6. The method according to claim 1, further wherein determining the degree of confidence for each radiological sign comprises:
transmitting the 3D fuzzy particle as well as its attributes to a predetermined classifier.

7. The method according to claim 1, wherein determining the degree of confidence for each radiological sign comprises:
measuring the grouping in a cluster of the 3D fuzzy particles;
extracting attributes from each measured cluster; and
transmitting the measured clusters as well as their respective attributes to the classifier, this classifier giving the degree of confidence of each cluster at output.

8. The method according to claim 1, wherein:
a candidate particle is defined by a candidate contour of the radiological sign;
a fuzzy contour is formed by the set of possible candidate contours and by their respective degrees of membership; and
the aggregation of the fuzzy contours in each projection image gives fuzzy surfaces in the digital volume.

9. The method according to claim 1, wherein:
a candidate particle is defined by a connected component of the radiological signs such as the candidate contour as well as the pixels present in and on the contour;
a fuzzy connected component is formed by the set of possible candidate connected components and by their respective degrees of membership; and
the aggregation of the fuzzy connected component in each projection image gives fuzzy volumes in the digital volume.

10. The method according to claim 1, wherein the classifier is a precise decision tree, a fuzzy decision tree using precise values, a fuzzy decision tree using fuzzy values, a neural network, or a vector support machine.

11. The method according to claim 1, wherein the projection images are pre-processed to eliminate the artifacts introduced firstly by the acquisition geometry and secondly by the detection of the contour of the body.

12. The method according to claim 1, wherein the 3D fuzzy particles or the customers are displayed by an enhancement of their contrast intensity relative to the intensity of their immediate environment depending on their degree of confidence.

13. The method according to claim 1, wherein the 3D fuzzy particles or the customers are displayed by the positioning of the markers.

14. A radiological apparatus comprising:
means for providing a source of radiation;
means for detecting radiation after passing through a body to be imaged;
means for providing control logic for processing signals detected by the means for detection; and
a memory or microprocessor associated with the means for providing control logic, the memory or microprocessor being configured to perform a method of image processing, the method comprising:
reconstructing a 3D image of a body from a set of radiography projection images;
locating structures presumed to be representative of 3D radiological signs within the 3D image;
determining a set of 2D candidate particles corresponding to projections of the presumed 3D radiological signs;
assigning, through a fuzzy logic description, to the 2D candidate particles a degree of membership in 2D membership classes of a set of membership classes, each membership class being relative to a type of radiological sign;
considering a 2D fuzzy particle being formed by the set of the 2D candidate particles and by their respective degrees of membership in a class;
making an aggregate of the 2D fuzzy particles to obtain 3D fuzzy particles in a digital volume; and
determining a degree of confidence for each 3D radiological sign from the 3D fuzzy particles.

15. The apparatus according to claim 14, wherein:
the candidate particle to be assigned to each presumed radiological sign is determined by applying successive thresholds; and
for each threshold, a candidate particle characterizing the presumed radiological sign is defined.

16. The apparatus according to claim 15, wherein:
the successive thresholds correspond to successive grey levels.

17. The apparatus according to claim 15, wherein the candidate particle is determined:
when the surface of the candidate particle is smaller than or equal to the predetermined maximum surface, and when the contrast of the candidate particle is greater than or equal to a predetermined maximum intensity of contrast minus the maximum variation of intensity of contrast permitted, then this candidate particle is the maximum particle that can be assigned to the presumed radiological sign.

18. The apparatus according to claim 14, wherein:
each 3D fuzzy particle is formed by a set of 3D candidate particles and their respective degrees of membership;
each 3D candidate particle is obtained by an aggregation operation from the 2D candidate particles through the projections; and
by a fuzzy logic description, each 3D candidate particle is assigned a degree of membership in each of the 3D classes of membership of a set of 3D membership classes, each membership class pertaining to a type of radiological sign, each class being predetermined.

19. A mammography apparatus comprising:
a source of X-ray radiation;
a detector of the X-ray radiation passing through an organ to be imaged;
a rotatable support for the source of radiation;
a holder for the organ;
a pad for compressing the organ; and
a control logic unit having a memory or microprocessor for processing signal detected by the detector, the memory or processor being configured to perform a method of image processing, the method comprising:
reconstructing a 3D image of at least a portion of the organ from a set of radiography projection images;
locating structures presumed to be representative of 3D radiological signs within the 3D image;
determining a set of 2D candidate particles corresponding to projections of the presumed 3D radiological signs;
assigning, through a fuzzy logic description, to the 2D candidate particles a degree of membership in 2D membership classes of a set of membership classes, each membership class being relative to a type of radiological sign;
considering a 2D fuzzy particle being formed by the set of the 2D candidate particles and by their respective degrees of membership in a class;
making an aggregate of the 2D fuzzy particles to obtain 3D fuzzy particles in a digital volume; and
determining a degree of confidence for each 3D radiological sign from the 3D fuzzy particles.

20. The apparatus according to claim 19, wherein:
the candidate particle to be assigned to each presumed radiological sign is determined by applying successive thresholds;
the successive thresholds correspond to successive grey levels;
for each threshold, a candidate particle characterizing the presumed radiological sign is defined; and
the candidate particle is determined when the surface of the candidate particle is smaller than or equal to the predetermined maximum surface, and when the contrast of the candidate particle is greater than or equal to a predetermined maximum intensity of contrast minus the maximum variation of intensity of contrast permitted, then this candidate particle is the maximum particle that can be assigned to the presumed radiological sign.

* * * * *